(12) United States Patent
Throngnumchai et al.

(10) Patent No.: US 9,525,302 B2
(45) Date of Patent: Dec. 20, 2016

(54) NONCONTACT POWER FEEDING APPARATUS AND NONCONTACT POWER FEEDING METHOD

(75) Inventors: Kraisorn Throngnumchai, Yokohama (JP); Toshihiro Kai, Yamato (JP); Yusuke Minagawa, Yokosuka (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 257 days.

(21) Appl. No.: 13/638,315

(22) PCT Filed: Mar. 7, 2011

(86) PCT No.: PCT/JP2011/055193
§ 371 (c)(1),
(2), (4) Date: Sep. 28, 2012

(87) PCT Pub. No.: WO2011/122249
PCT Pub. Date: Oct. 6, 2011

(65) Prior Publication Data
US 2013/0026850 A1 Jan. 31, 2013

(30) Foreign Application Priority Data

Mar. 31, 2010 (JP) ................ 2010-080737
Dec. 6, 2010 (JP) ................ 2010-271282

(51) Int. Cl.
*H01F 27/42* (2006.01)
*H01F 37/00* (2006.01)
(Continued)

(52) U.S. Cl.
CPC .............. *H02J 7/025* (2013.01); *B60L 11/182* (2013.01); *B60L 11/1829* (2013.01);
(Continued)

(58) Field of Classification Search
CPC ........ B60L 11/182; H02J 7/025; H02J 17/005; H01F 38/14; Y02T 10/7005
(Continued)

(56) References Cited

U.S. PATENT DOCUMENTS

| 7,070,743 B2 | 7/2006 | Blackwell et al. |
| 7,539,465 B2 * | 5/2009 | Quan ............ G06K 7/0008 331/77 |

(Continued)

FOREIGN PATENT DOCUMENTS

| EP | 2 161 811 A1 | 3/2010 |
| EP | 2196351 A1 * | 6/2010 |

(Continued)

OTHER PUBLICATIONS

Russian Office Action and translation, dated Dec. 5, 2013; (7 pgs.).
(Continued)

*Primary Examiner* — Rexford Barnie
*Assistant Examiner* — Rasem Mourad
(74) *Attorney, Agent, or Firm* — Foley & Lardner LLP

(57) ABSTRACT

As an aspect of the present invention, a noncontact power feeding apparatus includes: a power transmission resonator; and a power reception resonator configured to be magnetically coupled with the power transmission resonator by magnetic field resonance. The power transmission resonator is magnetically coupled with the power reception resonator by the magnetic field resonance, whereby electric power is supplied from an electric power source to the power reception resonator through the power transmission resonator. One of the power transmission resonator and the power reception resonator has a predetermined single resonant frequency, and the other one of the power transmission
(Continued)

resonator and the power reception resonator has multiple resonant frequencies inclusive of the predetermined single resonant frequency.

8 Claims, 17 Drawing Sheets

(51) Int. Cl.
    *H01F 38/00*         (2006.01)
    *H02J 7/02*          (2016.01)
    *B60L 11/18*        (2006.01)
    *H01F 38/14*        (2006.01)

(52) U.S. Cl.
    CPC .......... *H01F 38/14* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
    USPC ........................................................ 307/104
    See application file for complete search history.

(56) References Cited

U.S. PATENT DOCUMENTS

| | | |
|---|---|---|
| 8,008,888 B2 | 8/2011 | Oyobe et al. |
| 2003/0175196 A1 | 9/2003 | Blackwell et al. |
| 2004/0217763 A1* | 11/2004 | Moore .................... G01V 3/30 324/338 |
| 2010/0052431 A1* | 3/2010 | Mita .................... B60L 11/182 307/104 |
| 2010/0084918 A1* | 4/2010 | Fells ...................... H02J 5/005 307/32 |
| 2010/0225271 A1 | 9/2010 | Oyobe et al. |
| 2011/0025132 A1 | 2/2011 | Sato |
| 2011/0121778 A1 | 5/2011 | Oyobe et al. |
| 2011/0140653 A1* | 6/2011 | Jung ...................... H02J 7/025 320/108 |
| 2012/0001485 A1* | 1/2012 | Uchida ................... H02J 5/005 307/11 |
| 2012/0032525 A1 | 2/2012 | Oyobe et al. |

FOREIGN PATENT DOCUMENTS

| | | | |
|---|---|---|---|
| JP | 2009-106136 A | 5/2009 | |
| JP | EP 2196351 A1 * | 6/2010 | ............. B60L 5/005 |
| RU | 2 339 576 C2 | 11/2008 | |
| SU | 1130417 A | 12/1984 | |
| WO | WO 2008/081405 A1 | 7/2008 | |
| WO | WO 2009/054221 A1 | 4/2009 | |
| WO | WO 2009/091267 A2 | 7/2009 | |
| WO | WO 2009/131121 A1 | 10/2009 | |

OTHER PUBLICATIONS

Japanese Office Action with English language translation dated Sep. 30, 2014, 10 pgs.

* cited by examiner

FIG. 3A
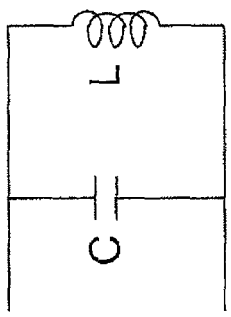
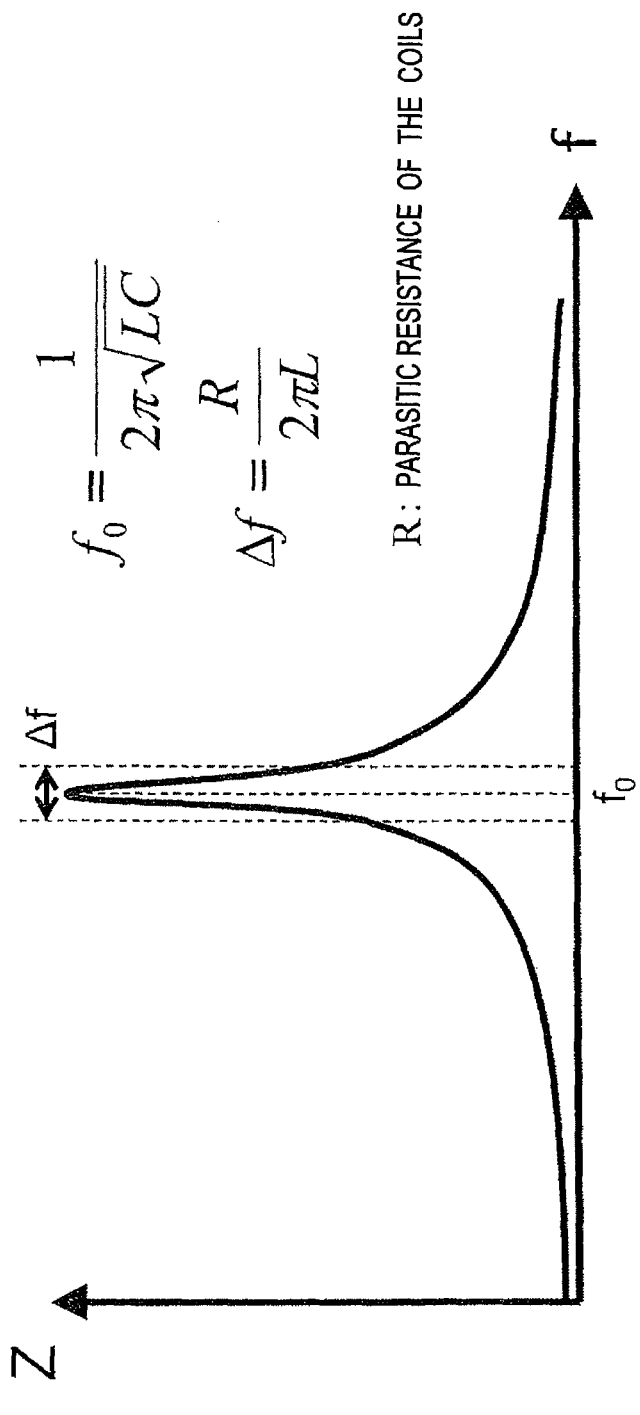
$$f_0 = \frac{1}{2\pi\sqrt{LC}}$$
$$\Delta f = \frac{R}{2\pi L}$$
R: PARASITIC RESISTANCE OF THE COILS FIG. 9
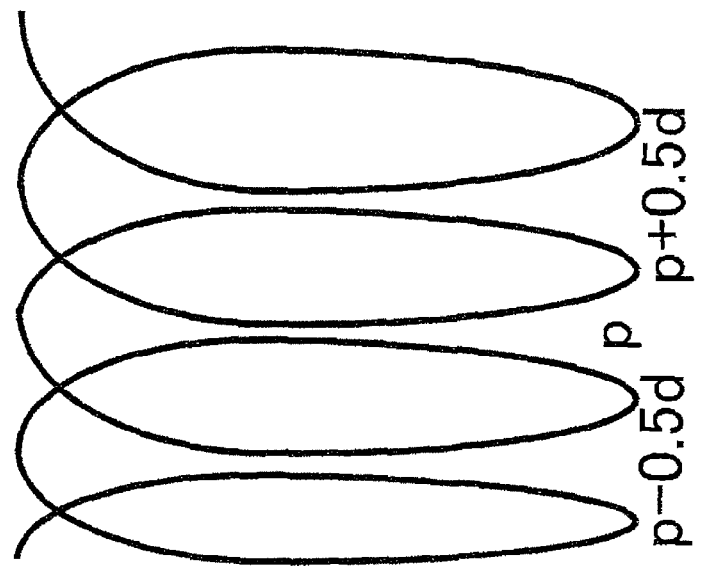
POWER RECEPTION COIL
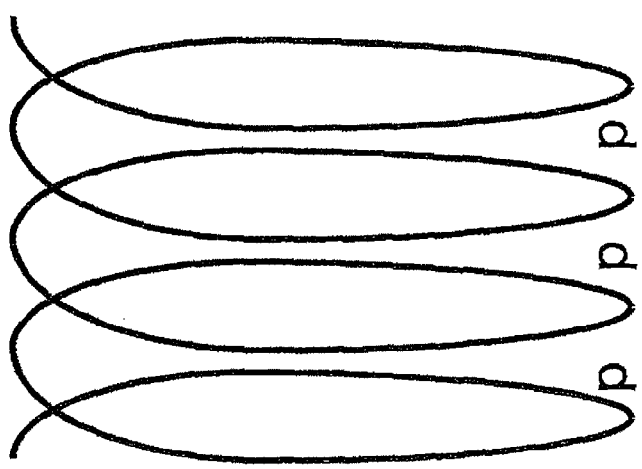
POWER TRANSMISSION COIL

NONCONTACT POWER FEEDING APPARATUS AND NONCONTACT POWER FEEDING METHOD

TECHNICAL FIELD

The present invention relates to a noncontact power feeding apparatus and a noncontact power feeding method using a resonance method.

BACKGROUND ART

A method of power transmission utilizing electromagnetic field resonance between a power transmission side and a power reception side has been known as a noncontact (wireless) power transmission technique. Here, multiple sets of resonant coils having the same resonant frequency are provided on the power reception side so that the power reception side can receive electric power transmitted from the power transmission side reliably and sufficiently even when a stop position of a vehicle deviates from a prescribed position (see paragraph [0094] and FIG. 10 of Patent Literature 1).

CITATION LIST

Patent Literature

Patent Literature 1: Japanese Patent Application Publication No. 2009-106136

SUMMARY OF INVENTION

However, since the multiple sets of the power reception resonant coils thus provided have the same resonant frequency, there is a problem of deterioration in power transmission efficiency when the resonant frequency for power reception or power transmission coils being initially set up varies due to an external factor such as an environmental condition.

A technical problem to be solved by the present invention is to provide a noncontact power feeding apparatus and a noncontact power feeding method, which are capable of suppressing deterioration in power transmission efficiency in case of a relative variation in the resonant frequency of a power transmission resonator or a power reception resonator.

As an aspect of the present invention, a noncontact power feeding apparatus includes: a power transmission resonator; and a power reception resonator configured to be magnetically coupled with the power transmission resonator by magnetic field resonance. The power transmission resonator is magnetically coupled with the power reception resonator by the magnetic field resonance, whereby electric power is supplied from an electric power source to the power reception resonator through the power transmission resonator. One of the power transmission resonator and the power reception resonator has a predetermined single resonant frequency, and the other one of the power transmission resonator and the power reception resonator has multiple resonant frequencies inclusive of the predetermined single resonant frequency.

According to the present invention, even when the resonant frequency for one of the power transmission resonator and the power reception resonator varies due to an external factor or the like, it is still possible to transmit the power using the varied resonant frequency because the other one of the power transmission resonator and the power reception resonator has multiple resonant frequencies inclusive of the aforementioned resonant frequency. Thereby, deterioration in power transmission efficiency can be suppressed in case of a relative variation in the resonant frequency.

BRIEF DESCRIPTION OF DRAWINGS

FIG. 3A shows a parallel LC resonant circuit and a graph of an impedance characteristic thereof.

FIG. 9 is a schematic diagram showing still another winding example of the power transmission coil 1 and the power reception coil 2 in FIG. 2.

DESCRIPTION OF EMBODIMENTS

First Embodiment

Figure 1:
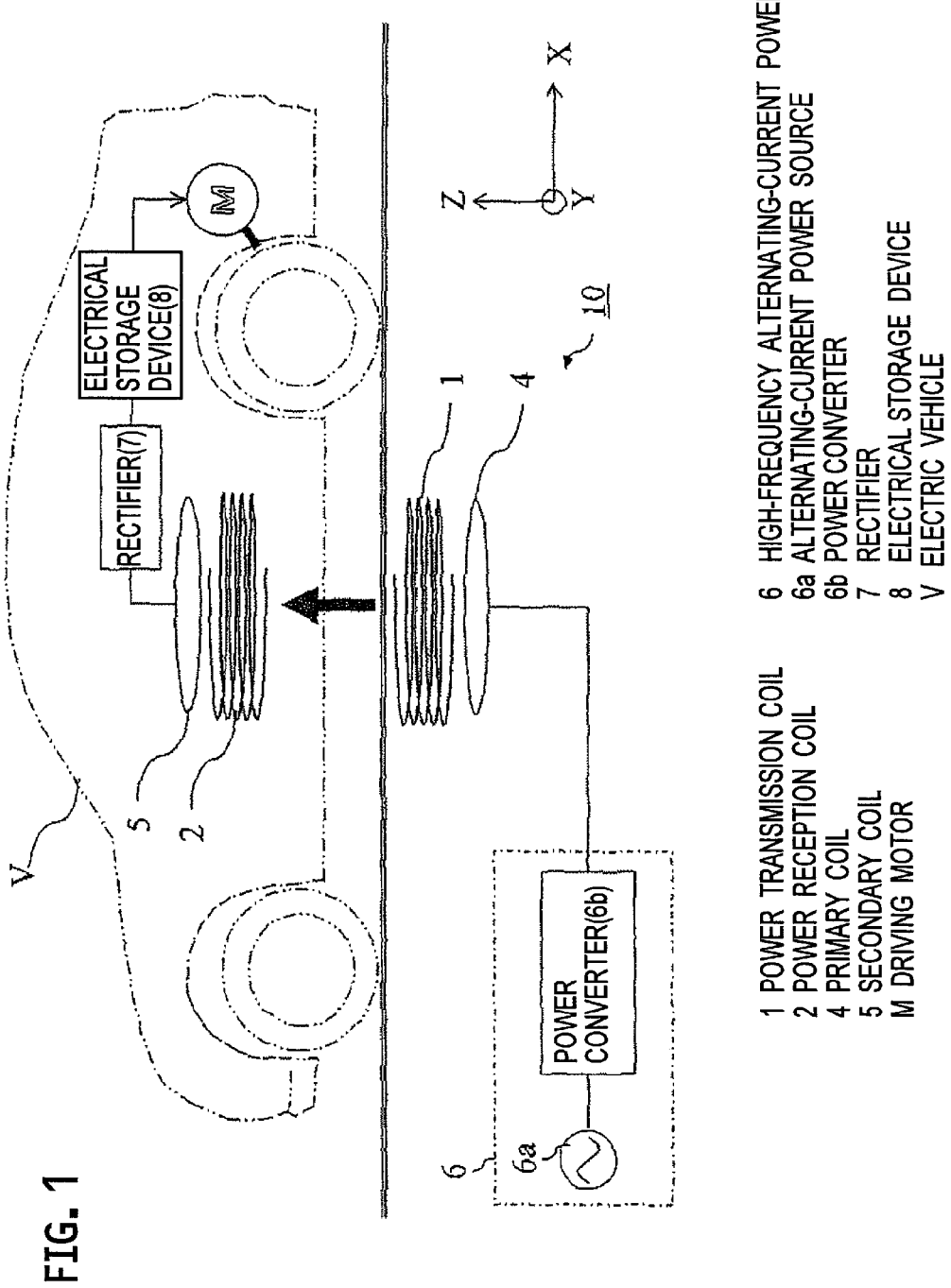
FIG. 1 is an overall configuration diagram showing a power feeding system for an electric vehicle to which a first embodiment of the present invention is applied.

A first embodiment of the present invention will be described below on the basis of the drawings. In the drawings, the same constituents are denoted by the same reference numerals, and duplicate explanation will be omitted. FIG. 1 is an overall configuration diagram showing a power feeding system for an electric vehicle to which a first embodiment of the present invention is applied, in which the present invention is embodied as a power feeding system for supplying electric power to a driving motor MT of an electric vehicle V.

A power feeding apparatus 10 of the embodiment includes a high-frequency alternating-current power source 6, a primary coil 4, a power transmission coil 1, a power reception coil 2, a secondary coil 5, a rectifier 7, and an electrical storage device 8. Of the power feeding apparatus 10, the power reception coil 2, the secondary coil 5, the rectifier 7, and the electrical storage device 8 are provided in the electric vehicle V, while the high-frequency alternating-current power source 6, the primary coil 4, and the power transmission coil 1 are provided outside the electric vehicle V. A power feeding spot is an example of the outside of the electric vehicle V.

Here, the driving motor MT is connected to a driving system (a power train) of the electric vehicle V. The driving motor MT generates a vehicle driving force upon receipt of electric power from the electrical storage device 8, and outputs the generated vehicle driving force to wheels via the driving system. Thereby, the electric vehicle V travels. Meanwhile, in the case of using an alternating-current motor as the driving motor MT, a power converter such as an inverter, which is not illustrated in FIG. 1, is provided between the electrical storage device 8 and the driving motor MT.

The power reception coil (a secondary self-resonant coil) 2 provided on the electric vehicle V is formed of LC coils each having two open (unconnected) ends, and is magnetically coupled with the power transmission coil (a primary self-resonant coil) 1 of the power feeding apparatus 10 by magnetic field resonance. Thus, the power reception coil 2 can receive alternating-current power from the power transmission coil 1. Specifically, the number of turns, the thickness, and the winding pitch of the power reception coil 2 are set as appropriate based on various conditions including a voltage of the electrical storage device 8, a power transmission distance between the power transmission coil 1 and the power reception coil 2, resonant frequencies of the power transmission coil 1 and the power reception coil 2, and the like. The number of turns, the thickness, and the winding pitch of the power reception coil 2 are set so as to achieve a large Q value indicating resonance strength between the power transmission coil 1 and the power reception coil 2 as well as a large κ value indicating the degree of coupling therebetween. A configuration of the power reception coil 2 including the setting of the resonant frequencies will be described later.

The secondary coil 5 is a one-turn coil whose two ends are connected to rectifier 7, and is capable receiving the electric power from the power reception coil 2 by electromagnetic induction. It is preferable that the secondary coil 5 be located coaxially with the power reception coil 2. The secondary coil 5 is provided in order to avoid a variation in a self-resonant frequency of the power reception coil 2. The secondary coil 5 outputs the electric power received from the power reception coil 2 to the rectifier 7.

The rectifier 7 rectifies the high-frequency alternating-current power received from the secondary coil 5, and outputs the rectified power to the electrical storage device 8. Here, instead of the rectifier 7, it is also possible to use an AC/DC converter configured to convert the high-frequency alternating-current power received from the secondary coil 5 into direct-current power. In this case, a voltage level of the direct-current power is set equal to a voltage level of the electrical storage device 8.

The electrical storage device 8 is a chargeable and dischargeable direct-current power source which is formed of a secondary cell using lithium ions or nickel-metal hydride. The voltage of the electrical storage device 8 is in a range from about 200 to 500 V, for example. The electrical storage device 8 is capable of storing the electric power supplied from the rectifier 7, and moreover, of storing regenerated power that is generated by the driving motor MT. Then, the electrical storage device 8 supplies the stored power to the driving motor MT. Here, a large-capacity capacitor may be used as the electrical storage device 8 in place of or in addition to the secondary cell. The electrical storage device 8 only needs to be an electric power buffer which is capable of; temporarily storing the electric power from the rectifier 7 or the driving motor MT; and supplying the stored electric power to the driving motor MT.

Meanwhile, the high-frequency alternating-current power source 6 installed on the outside of the electric vehicle V (at the power feeding spot) includes a system power source 6a (a commercial infrastructural alternating-current power source owned by an electric power company), and a power converter 6b, for example. The power converter 6b converts alternating-current power received from the alternating-current power source 6a into the high-frequency alternating-current power which can be transmitted from the power transmission coil 1 to the power reception coil 2 on the electric vehicle V, and supplies the high-frequency alternating-current power thus converted to the primary coil 4.

The primary coil 4 is capable of transmitting the alternating-current power to the power transmission coil 1 by electromagnetic induction, and is preferably located coaxially with the power transmission coil 1. The primary coil 4 is provided in order to avoid a variation in a self-resonant frequency of the power transmission coil 1. Moreover, the primary coil 4 outputs the electric power received from the power converter 6b to the power transmission coil 1.

The power transmission coil 1 is installed in the vicinity of the ground at the power feeding spot, for example. The power transmission coil 1 is formed of LC resonant coils each having two open (unconnected) ends, and is magnetically coupled with the power reception coil 2 on the electric vehicle V by magnetic field resonance. Thus, the power transmission coil 1 is capable of transmitting the alternating-current power to the power reception coil 2. Specifically, the number of turns, the thickness, and the winding pitch of the power transmission coil 1 are set as appropriate based on various conditions including the voltage of the electrical storage device 8 charged by the power transmitted from the power transmission coil 1, the power transmission distance between the power transmission coil 1 and the power reception coil 2, the resonant frequencies of the power transmission coil 1 and the power reception coil 2, and the like so as to achieve the large Q value and the large κ value. A configuration of the power transmission coil 1 including the setting of the resonant frequency will be described later.

Figure 2:
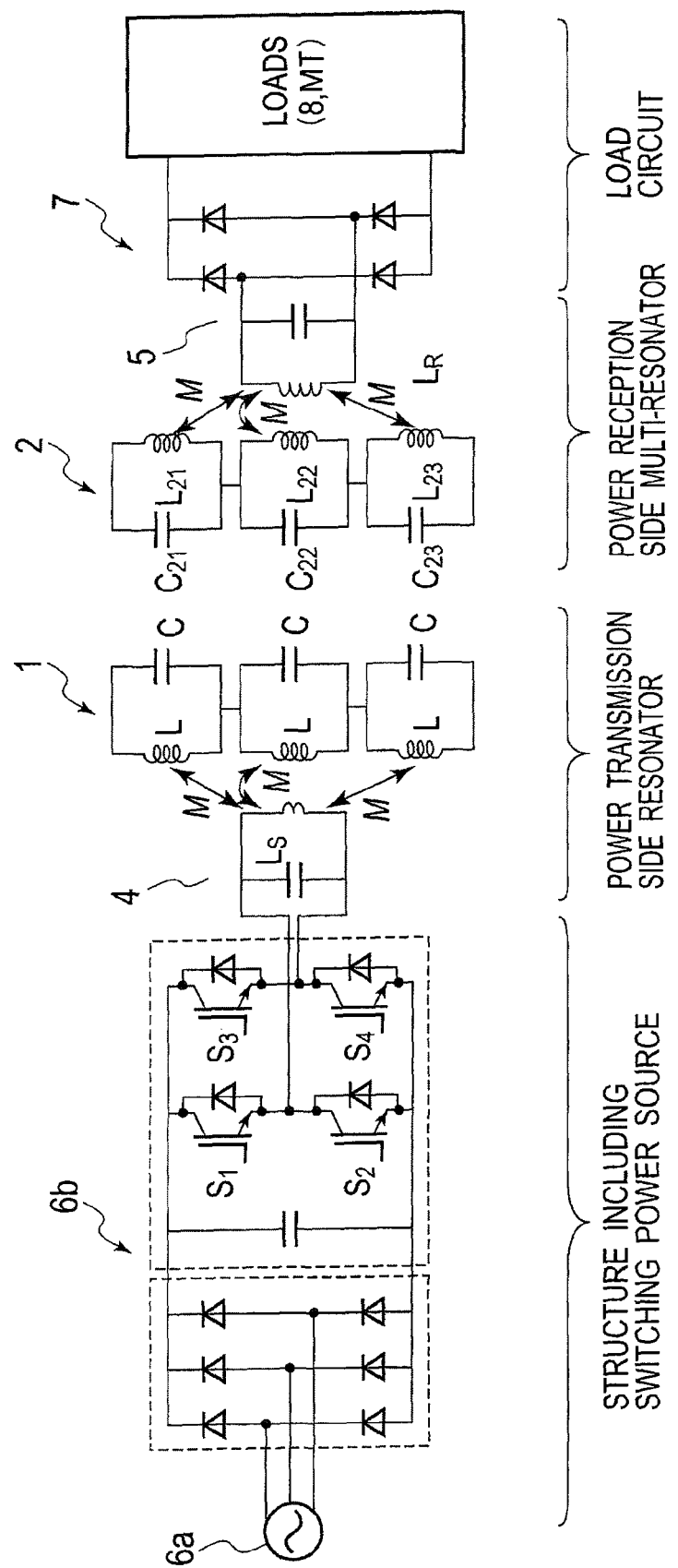
FIG. 2 is an electric circuit diagram showing a detailed configuration of the power feeding system in FIG. 1.

FIG. 2 is a circuit diagram further specifying the power feeding system shown in FIG. 1. The power converter 6b shown in FIG. 1 can be materialized as a switching power source as shown in FIG. 2, for example. The switching power source 6b in FIG. 2 includes: a rectifier circuit formed of multiple diodes and configured to rectify the alternating-current power source 6a; and a chopper circuit provided with multiple transistors and configured to generate the high-frequency alternating-current power from direct-current power obtained by the rectification.

The primary coil 4 forms magnetic coupling M between the primary coil 4 and each of the three LC resonant coils included in the power transmission coil 1, and thereby transmits the alternating-current power generated by the power converter 6b to the power transmission coil 1.

As shown in FIG. 2, the power transmission coil 1 includes the three LC resonant circuits which are mutually connected in series, for example. Each LC resonant circuit is set so as to have a single self-resonant frequency f0. Note that the self-resonant frequency of each LC resonant circuit can be set by adjusting the coil shape and size including the number of turns, the thickness, and the winding pitch of the coil.

In the meantime, the power reception coil 2 includes three LC resonant circuits $L_{21}C_{21}$, $L_{22}C_{22}$, $L_{23}C_{23}$ which are mutually connected in series, for example. The three LC resonant circuits $L_{21}C_{21}$, $L_{22}C_{22}$, $L_{23}C_{23}$ are installed so as to be capable of receiving the alternating-current power transmitted from the respective resonant circuits LC of the power transmission coil 1.

Meanwhile, the secondary coil 5 includes a coil $L_R$ which forms magnetic coupling M between the secondary coil 5 and coils $L_{21}$, $L_{22}$, $L_{23}$ in the respective three LC resonant circuits $L_{21}C_{21}$, $L_{22}C_{22}$, $L_{23}C_{23}$. Thus, the secondary coil 5 is capable of receiving the alternating-current power from the power reception coil 2. The rectifier 7 can be materialized by using a circuit including multiple diodes for rectifying the received electric power. Thus, the alternating-current power received by the three LC resonant circuits $L_{21}C_{21}$, $L_{22}C_{22}$, $L_{23}C_{23}$ is capable of being transferred to loads such as the electrical storage device 8 and the motor MT.

In FIG. 2, the alternating-current power source 6a and the power converter 6b constitute a "structure including a switching power source"; the primary coil 4 and the power transmission coil 1 constitute a "power transmission side resonator"; the power reception coil 2 and the secondary coil 5 constitute a "power reception side multi-resonator"; and the rectifier 7 and the loads (8, MT) constitute a load circuit.

The principle of power transmission in accordance with the resonance method will be described. The resonance method is the method of transmitting the electric power wirelessly from one coil to another coil by bringing two LC resonant coils having the same natural frequency into resonance through a magnetic field.

Specifically, as shown in FIG. 1, the high-frequency alternating-current power is inputted from the high-frequency alternating-current power source 6 into the primary coil 4. Thereby, a magnetic field is generated in the primary coil 4, and high-frequency alternating-current power is generated in the power transmission coil 1 by electromagnetic induction. Each of the power transmission coil 1 and the power reception coil 2 functions as a LC resonant circuit using inductance L of the coil itself and stray capacitance C between conductor wires. The power reception coil 2 has the same resonant frequency as the power transmission coil 1, and is therefore magnetically coupled with the power transmission coil 1 by magnetic field resonance. As a consequence, the alternating-current power is transferred from the power transmission coil 1 to the power reception coil 2. Then, a magnetic field is generated in the power reception coil 2 upon receipt of the alternating-current power. The magnetic field in the power reception coil 2 generates high-frequency alternating-current power in the secondary coil 5 by electromagnetic induction. The alternating-current power in the secondary coil 5 is rectified to direct-current power by the rectifier 7, and is then supplied to the electrical storage device 8.

In the meantime, a LC resonant circuit in which a capacitor C and a coil L are connected in parallel is shown in an upper part of FIG. 3A, and an impedance characteristic (frequency f-impedance Z) of the parallel LC resonant circuit is shown in a lower part of FIG. 3A. In FIG. 3A, $f_0$ denotes the resonant frequency, and $\Delta f$ denotes a half width of the resonant frequency. In Formula (1) and Formula (2), "L" denotes inductance of the coil L, "C" denotes stray capacitance between conductor wires of the coil L, and "R" denotes a parasitic resistance value of the coil L.

[Expression 1]

$$f_0 = \frac{1}{2\pi\sqrt{LC}} \quad (1)$$

$$\Delta f = \frac{R}{2\pi L} \quad (2)$$

As apparent from Formula (1) and Formula (2), the parasitic resistance becomes smaller as a loss of the coil L becomes smaller. As a consequence, the half width $\Delta f$ of the resonant frequency becomes narrower, and the parallel LC resonant circuit therefore exhibits a steep resonance characteristic.

Figure 3B:
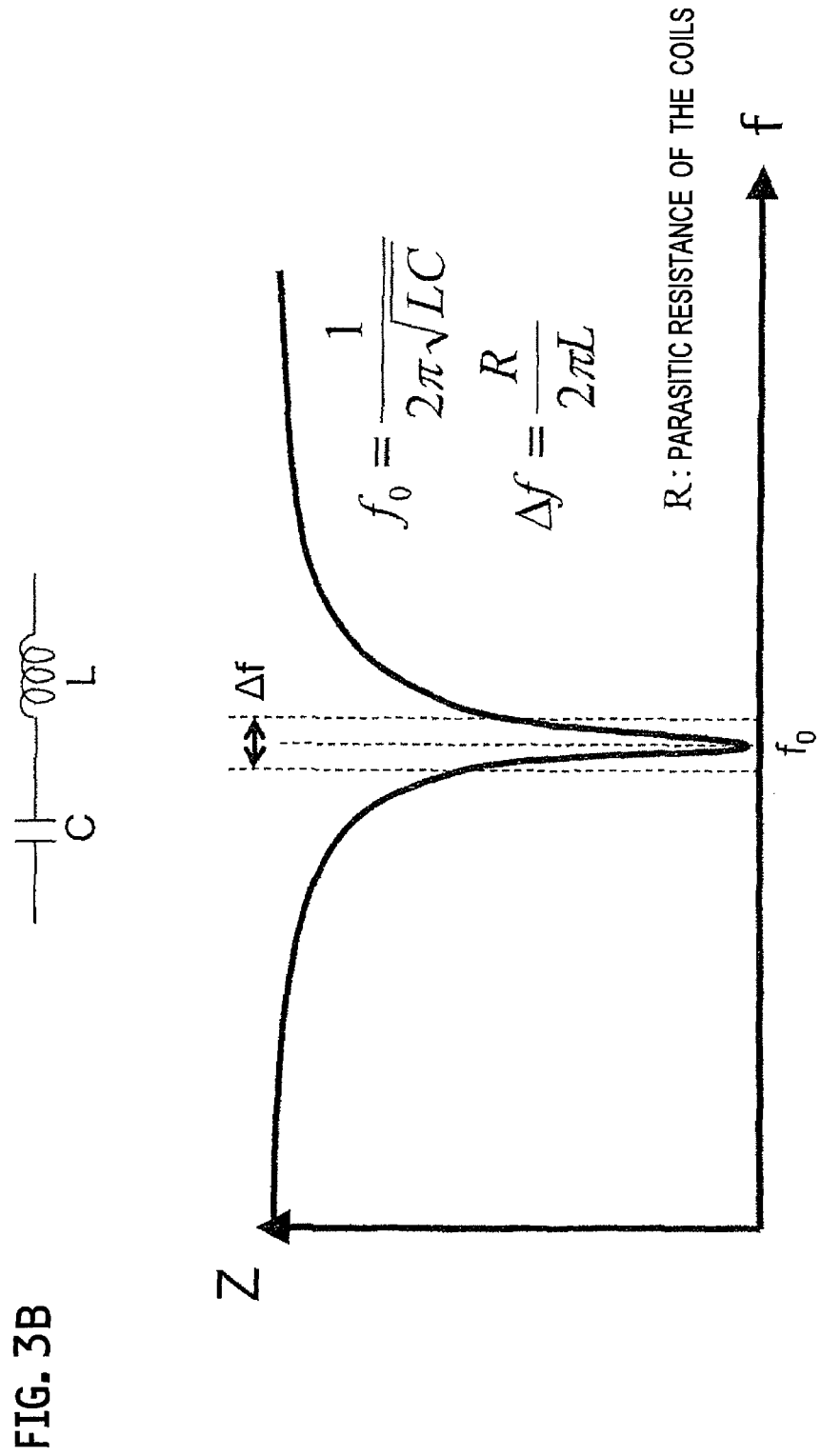
FIG. 3B shows a serial LC resonant circuit and a graph of an impedance characteristic thereof.

A LC resonant in which a capacitor C and a coil L are connected in series circuit (also referred to as an antiresonant circuit) is shown in an upper part of FIG. 3B, and an impedance characteristic (frequency f-impedance Z) of the serial LC resonant circuit is shown in a lower part of FIG. 3B. The impedance characteristic shown in FIG. 3B is different from that of FIG. 3A in that a minimum value appears in FIG. 3B instead of a maximum point in FIG. 3A. For the rest, the serial LC resonant circuit shown in FIG. 3B exhibits the similar impedance characteristic to that of the serial LC resonant circuit shown in FIG. 3A. Specifically, in the serial LC resonant circuit, the parasitic resistance becomes smaller as the loss of the coil L becomes smaller. As a consequence, the half width $\Delta f$ of the resonant frequency becomes narrower, and the parallel LC resonant circuit therefore exhibits a steep resonance characteristic.

Figure 3C:
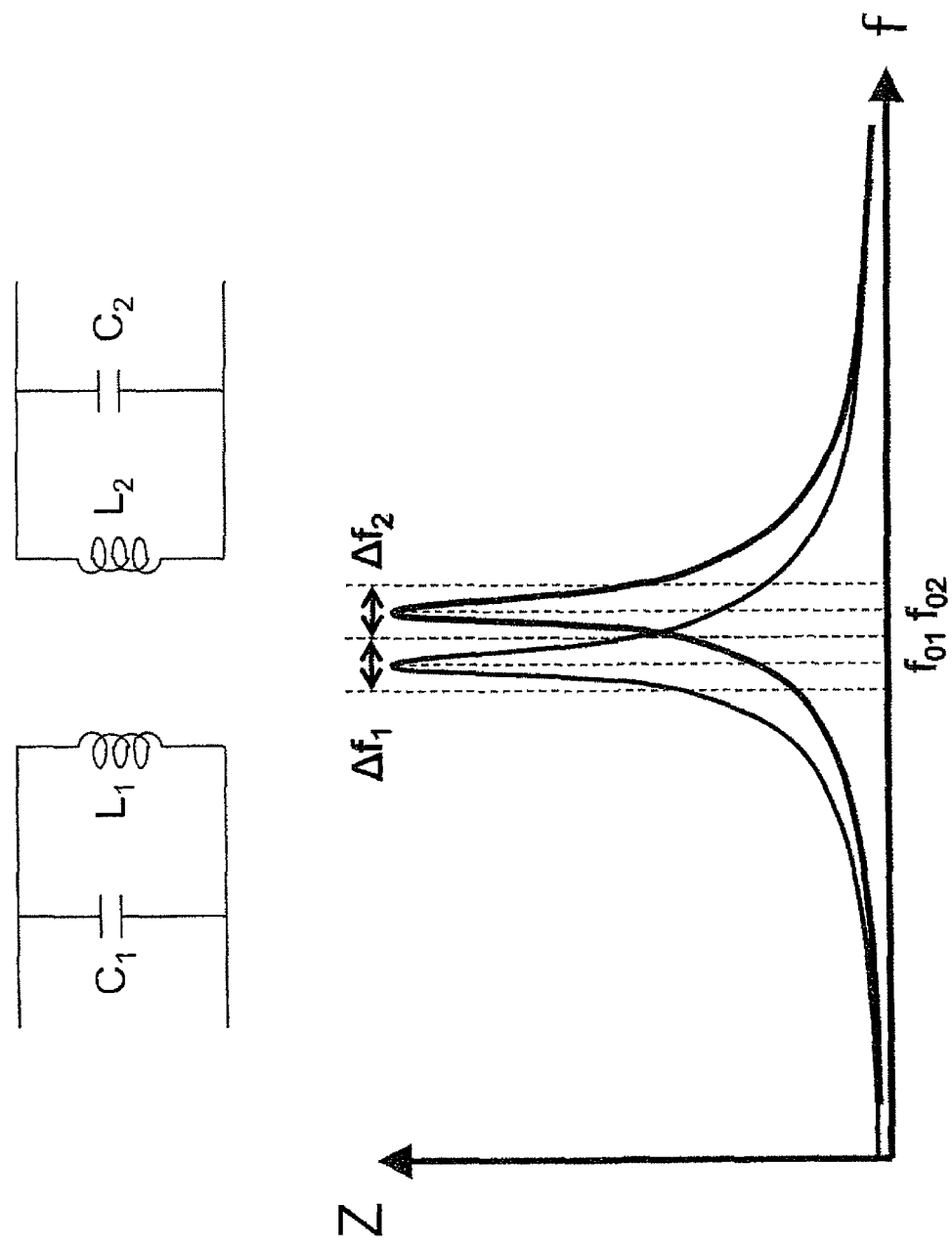
FIG. 3C shows a pair of LC resonant circuits having different resonant frequencies and a graph of impedance characteristics thereof.

Resonance means a state where a pair of LC resonant circuits set to have the same resonant frequency exchange energy at high efficiency using the resonant frequency. The inventors of the present invention have reached the following knowledge as a result of extensive studies. Specifically, as shown in FIG. 3C, for example, even if a resonant frequency $f_{01}$ of a LC resonant circuit $L_1C_1$ is different from a resonant frequency $f_{02}$ of another LC resonant circuit $L_2C_2$, the resonant circuits can still exchange energy at high efficiency like through the resonance when ranges of their half widths $\Delta f_1$ and $\Delta f_2$ overlap each other.

Figure 4:
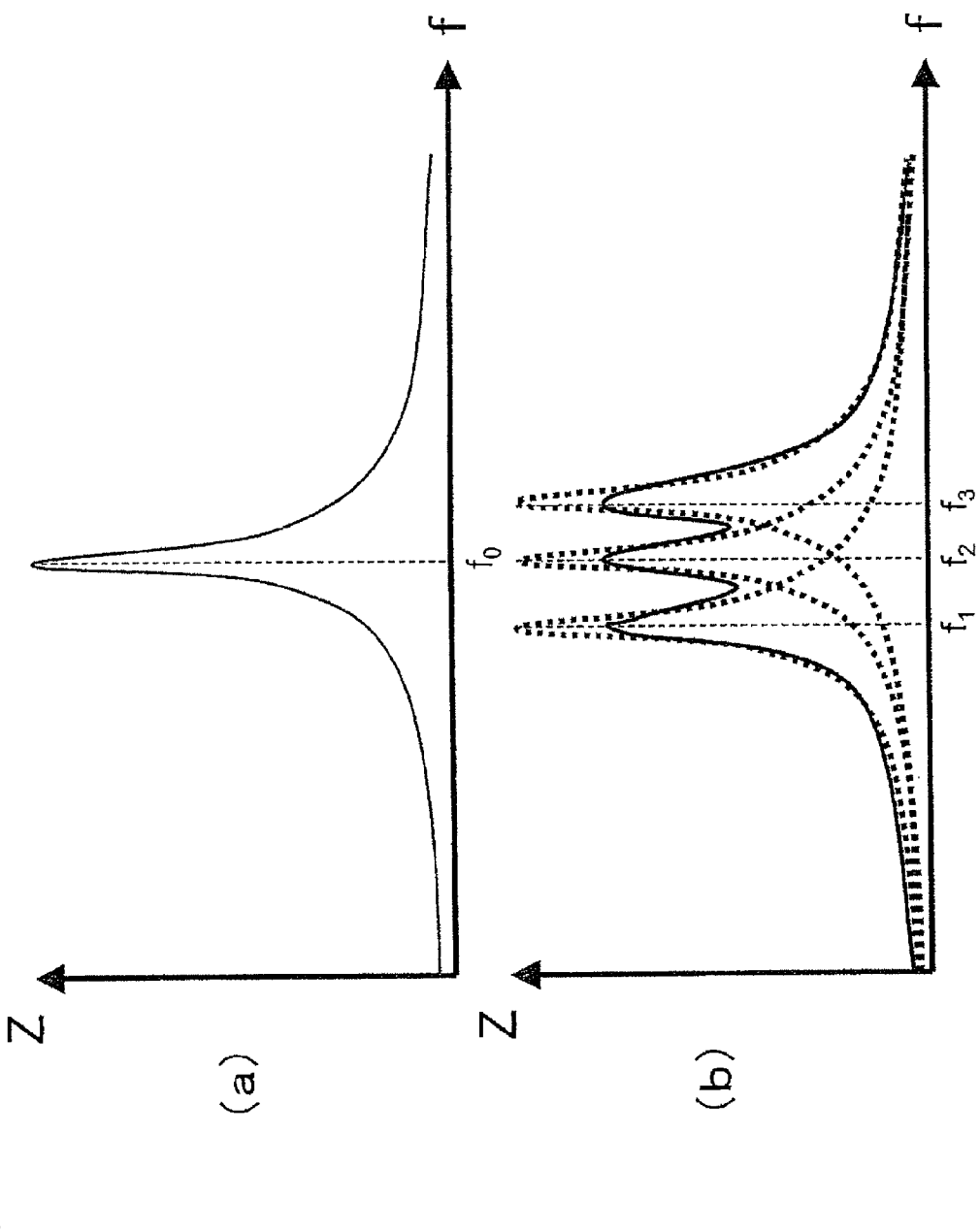
FIG. 4(a) is a graph showing an impedance characteristic of a power transmission coil 1 in FIG. 1 and FIG. 2.
FIG. 4(b) is a graph showing impedance characteristics of a power reception coil 2 therein.

Impedance characteristics of the power transmission coil 1 and the power reception coil 2 are set as described below on the basis of the above-mentioned knowledge acquired by the inventors. FIG. 4(a) shows an impedance characteristic of the power transmission coil 1 and FIG. 4(b) shows an impedance characteristic of the power reception coil 2.

All the three LC resonant circuits constituting the power transmission coil 1 shown in FIG. 2 include the coils L of the same type. The three LC resonant circuits therefore have the same values of the inductance L of the coil L, the stray capacitance C of the coil L, and the parasitic resistance R of the coil L. Accordingly, the power transmission coil 1 has the single resonant frequency $f_0$, as shown in Formula (1). Here, it is preferable to use coils L having small parasitic resistance R in order to enhance power transmission efficiency. When the parasitic resistance R of the coils L is reduced, the half width $\Delta f$ of the resonant frequency becomes narrower as shown in Formula (2), and the parallel LC resonant circuit therefore exhibits a steep resonance characteristic. As a result, it is possible to improve safety because energy is not transferred to objects or electronic devices having resonant frequencies outside the half width $\Delta f$.

In contrast, the three LC resonant circuits constituting the power reception coil 2 shown in FIG. 2 respectively include coils L of different types. The three LC resonant circuits therefore have different values of the inductance L of the coil L, the stray capacitance C of the coil L, and the parasitic resistance R of the coil L. Accordingly, the power reception coil 2 has multiple resonant frequencies $f_1$, $f_2$, $f_3$, as shown in Formula (1). When a relationship among the three resonant frequencies $f_1$, $f_2$, $f_3$ of the power reception coil 2 is defined as $f_1 < f_2 < f_3$, the resonant frequency $f_0$ of the power transmission coil 1 is preferably set to a frequency which at least satisfies $f_1 < f_0 < f_3$.

Dashed lines in FIG. 4(b) show the respective impedance characteristics of the three LC resonant circuits constituting the power reception coil 2. A solid line in FIG. 4(b) shows an overall impedance characteristic of the three LC resonant circuits combining the impedance characteristics of the three LC resonant circuits together, which is obtained as an outcome of resonance at the respective resonant frequencies $f_1$, $f_2$, $f_3$ of the LC resonant circuits. Since the three LC resonant circuits constituting the power reception coil 2 have the different resonant frequencies $f_1$, $f_2$, $f_3$, a frequency characteristic (the half width $\Delta f$) of the LC resonant circuits on the power receiving side as a whole can be made wider without increasing parasitic resistance R of each of the coils $L_{21}$, $L_{22}$, $L_{23}$. Then, such a multi-resonance circuit having the widened frequency characteristic is applied to the power reception side multi-resonator. As a consequence, even when the resonant frequency $f_0$ of the LC resonant circuit on the power transmission side varies for some reason, this LC resonant circuit will enter into resonance with one of the LC resonant circuits on the power reception side. It is thus possible to transfer energy while suppressing deterioration in power transmission efficiency.

In the meantime, the power transmission coil 1 shown in FIG. 2 includes the three LC resonant circuits having the same resonant frequency $f_0$. This is because: the power reception coil 2 includes the three LC resonant circuits set at the mutually different resonant frequencies $f_1$, $f_2$, $f_3$; and the power transmission coil 1 can be located as close to the these three LC resonant circuits as possible. This makes it possible to suppress deterioration in power transmission efficiency attributed to the distance between the power transmission coil 1 and the power reception coil 2.

Second Embodiment

Figure 5:
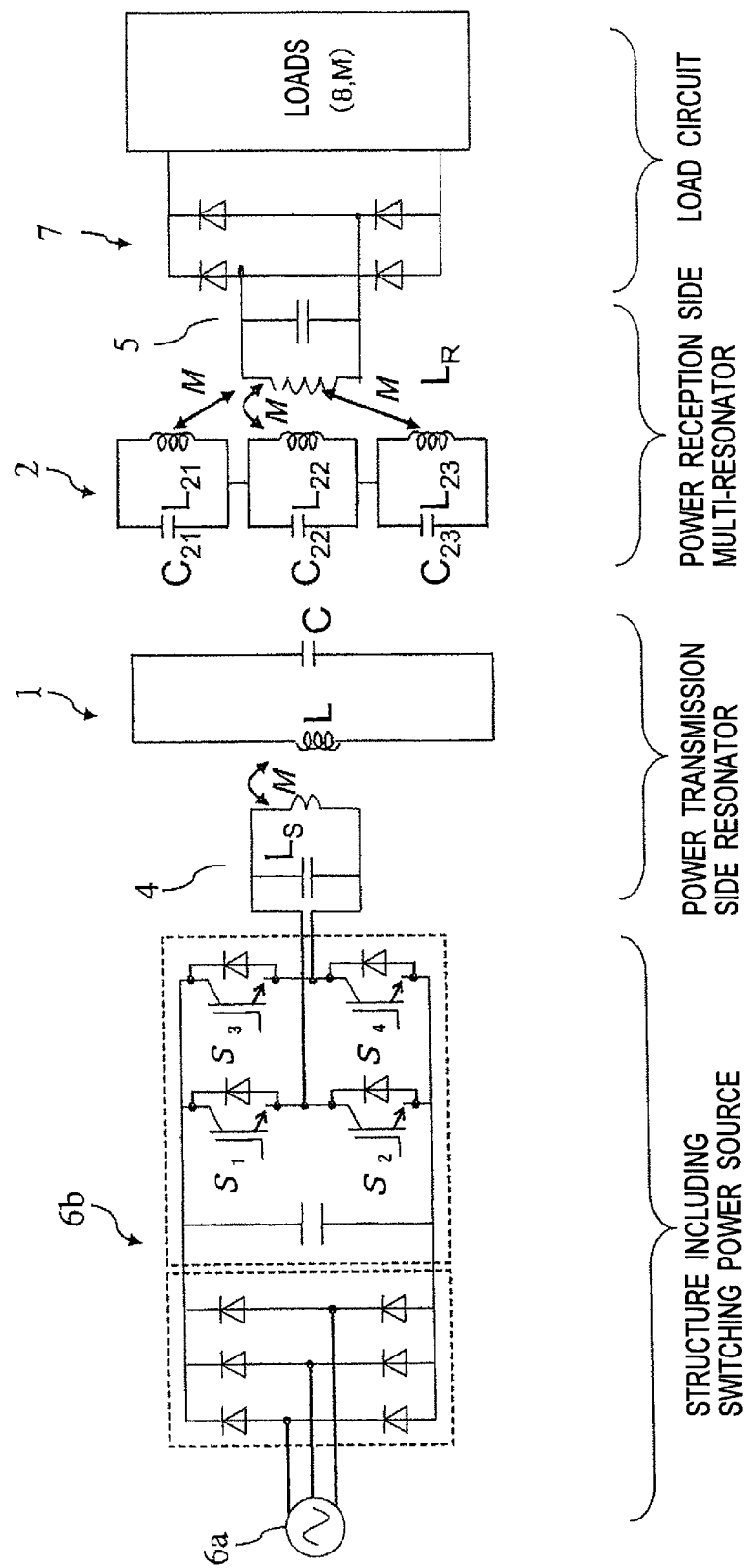
FIG. 5 is an electric circuit diagram showing another example of the power transmission coil 1 and the power reception coil 2 in FIG. 2.

The number of the LC resonant circuits constituting any of the power transmission coil 1 and the power reception coil 2 is not limited only to the example shown in FIG. 2. For instance, as shown in FIG. 5, a LC resonant circuit constituting the power transmission coil 1 may be formed of one coil L and one capacitor C. In this case, it is preferable to increase a coil diameter so that the coil can be located as close as possible to the multiple LC resonant circuits which constitute the power reception coil 2. Here, the resonant circuits of the power reception coil 2 have to include at least two LC resonant circuits in order to effect the multiple resonant frequencies.

Third Embodiment

Figure 6:
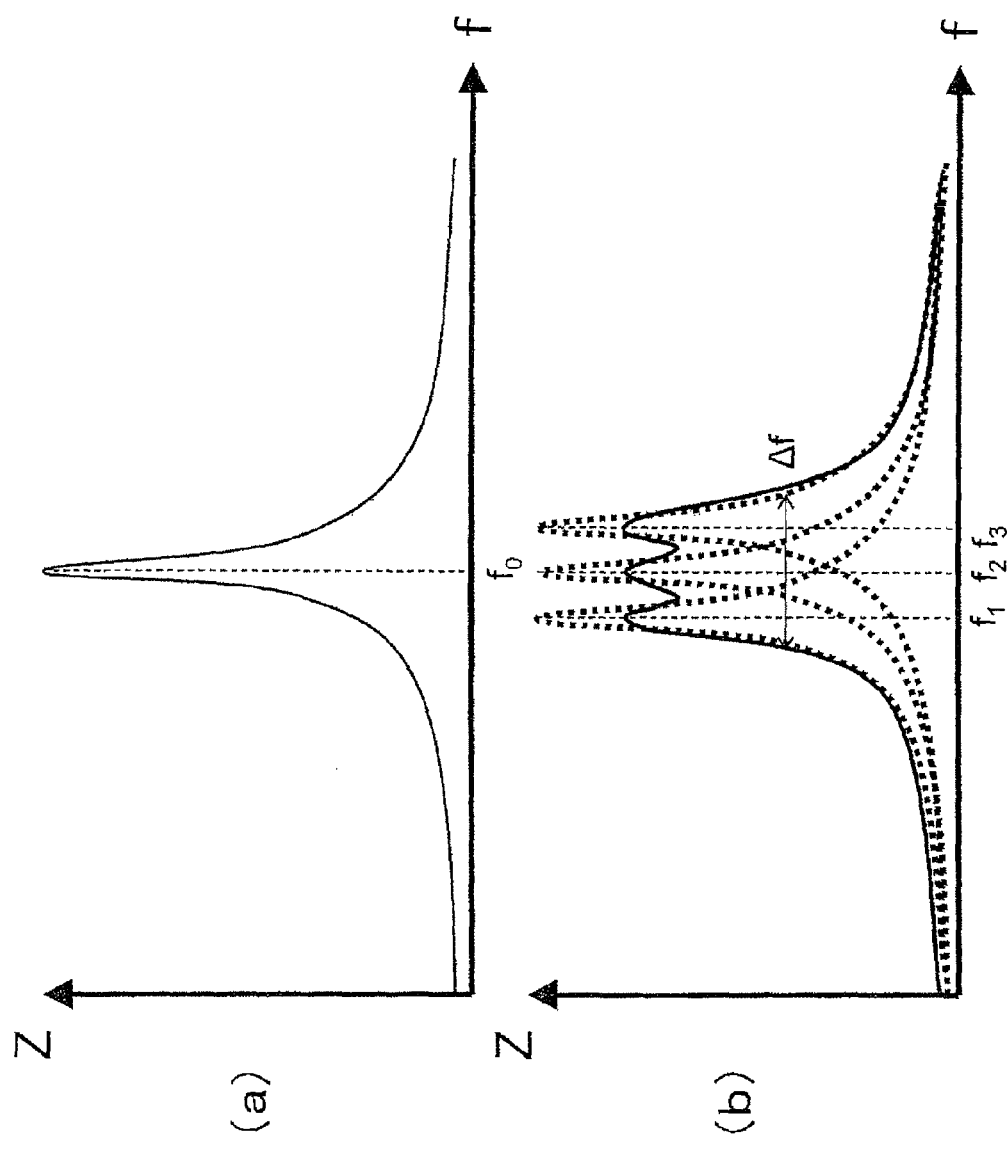
FIG. 6 is a graph showing another example of the impedance characteristic of the power transmission coil 1 and the impedance characteristic of the power reception coil 2 in FIG. 4.

In the power feeding system shown in FIG. 2, the resonant frequencies $f_1$, $f_2$, $f_3$ of the power reception coil 2 may be set as described below. Like FIG. 4(a), FIG. 6(a) shows the impedance characteristic of the LC resonant circuits constituting the power transmission coil 1. Like FIG. 4(b), FIG. 6(b) shows the impedance characteristics of the LC resonant circuits constituting the power reception coil 2. Specifically, dashed lines in FIG. 6(b) show the respective impedance characteristics of the three LC resonant circuits constituting the power reception coil 2. A solid line in FIG. 6(b) shows an overall impedance characteristic of the three LC resonant circuits obtained by combining the impedance characteristics of the three LC resonant circuits together. At least one of the resonant frequencies $f_1$, $f_2$, $f_3$ of the three LC resonant circuits is set within a range of the half width $\Delta f$ an adjacent one of the resonant frequencies. Accordingly, the combined impedance characteristic of the LC resonant circuits indicated with the solid line in FIG. 6(b) can be adjusted to have a relatively flat characteristic within a predetermined frequency range. Thus, it is possible to realize the relatively wide half width $\Delta f$ while avoiding an increase in the loss of the coil L attributed to an increase in the parasitic resistance R. In the example of FIG. 6(b), each of the resonant frequencies $f_1$, $f_2$, $f_3$ of the three LC resonant circuits is set within the range of the half width $\Delta f$ the resonant frequency adjacent thereto.

Operations of the electric circuits shown in FIG. 2 are as described below. Specifically, the resonant frequency of the LC resonant circuits of the power transmission coil 1 is set at $f_0$, and the resonant frequencies of the three LC resonant circuits of the power reception coil 2 are set at $f_1$, $f_2$, $f_3$, respectively. Moreover, $f_2$ is set equal to $f_0$, for example. In this case, the three LC resonant circuits of the power transmission coil 1 enter into resonance with the LC resonant circuit in the middle having the resonant frequency $f_2$ among the three LC resonant circuits of the power reception coil 2, and transfer energy thereto at high efficiency. In the meantime, the range of the half width $\Delta f$ of the LC resonant circuit in the middle having the resonant frequency $f_2$ overlaps those of the LC resonant circuits on both ends each having the resonant frequency either smaller or greater than $f_2$ (the resonant frequency $f_1$ or $f_3$). For this reason, the energy is transferred at high efficiency from the LC resonant circuit in the middle having the resonant frequency $f_2$ to the LC resonant circuits on both sides. As a consequence, the energy can be efficiently transferred from the entire LC resonant circuits of the power transmission coil 1 to the entire LC resonant circuits of the power reception coil 2.

As described above, the half widths $\Delta f$ of the multiple LC resonant circuits constituting the power reception coil 2 is set to overlap one another. Accordingly, even in case of a variation in the resonant frequency $f_0$ of the LC resonant circuits of the power transmission coil 1, the alternating-current power efficiently can be transmitted as long as the variation falls within a predetermined range, i.e., within the range of the combined half width $\Delta f$ (see FIG. 6) of the LC resonant circuits constituting the power reception coil 2.

Fourth Embodiment

Figure 7:
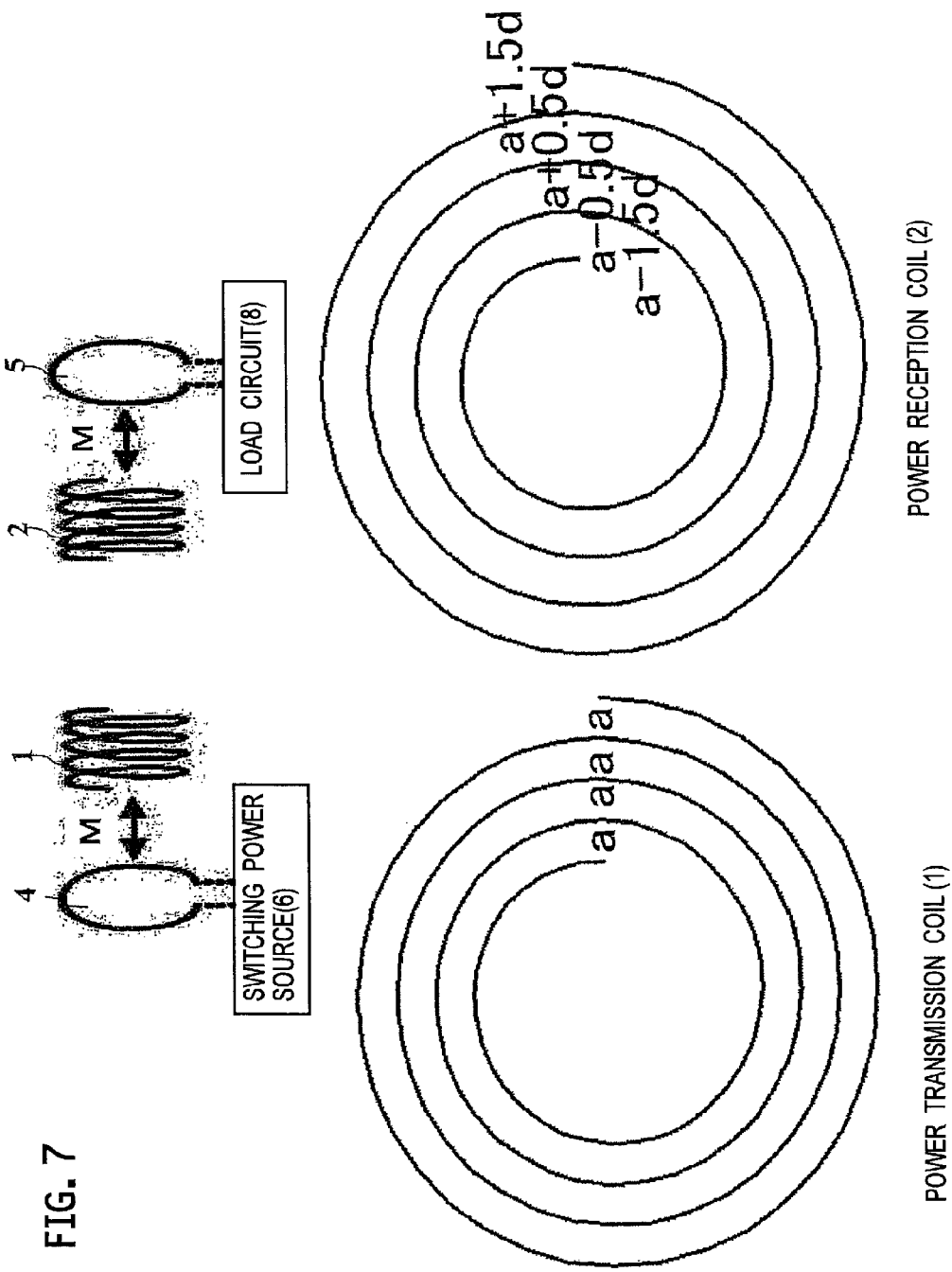
FIG. 7 is a schematic diagram showing an example of winding pitches of the power transmission coil 1 and the power reception coil 2 in FIG. 2.

FIG. 7 shows the power transmission coil 1 and the power reception coil 2 to which a fourth embodiment of the present invention is applied. Like the power feeding system shown in FIG. 1, a power feeding system of the fourth embodiment includes the switching power source 6, the primary coil 4, the power transmission coil (a LC resonant circuit) 1, the power reception coil (a LC resonant circuit) 2, the secondary coil 5, and the load circuit 8. Each of the power transmission coil 1 and the power reception coil 2 uses a self-resonant circuit formed of self inductance L and stray capacitance C.

Figure 8:
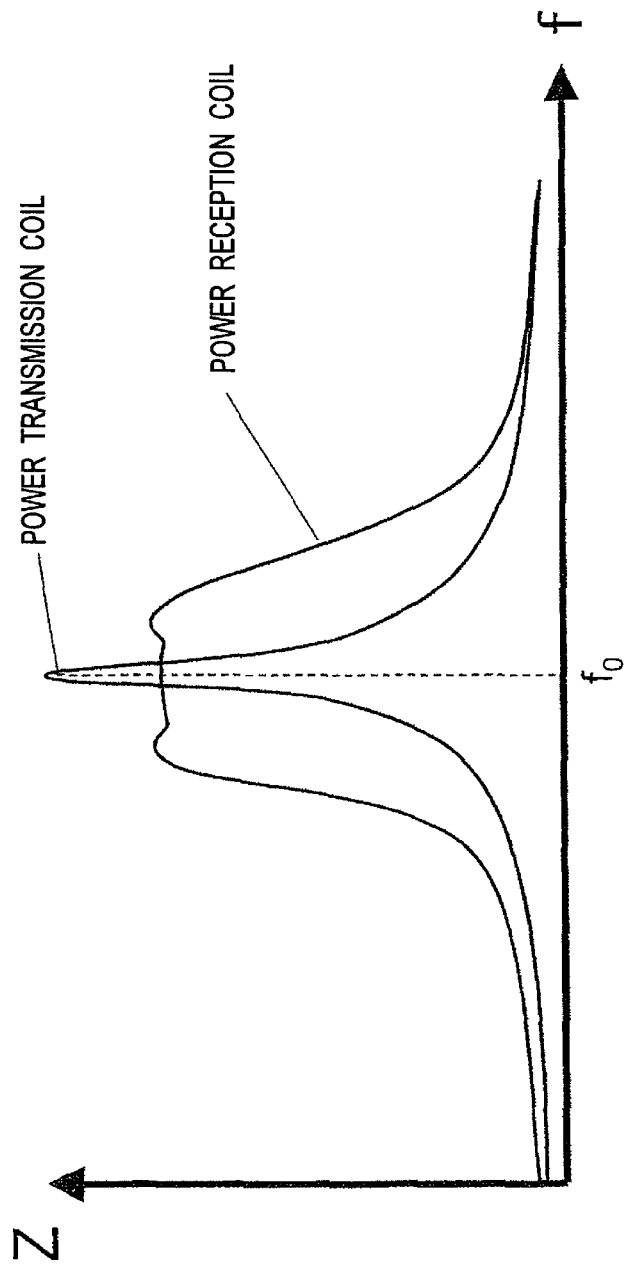
FIG. 8 is a graph showing self-resonance characteristics of the power transmission coil 1 and the power reception coil 2 in FIG. 7.

Moreover, in order to set the power transmission coil 1 in a single-resonance structure, the power transmission coil 1 of the fourth embodiment employs a coil prepared by winding a wire evenly (at a pitch a) as shown in FIG. 7. Since the wire is evenly wound, stray capacitance factors between the pitches of the wire spread evenly whereby the power transmission coil 1 exhibits a self-resonance characteristic of the single-resonance structure as shown in FIG. 8. On the other hand, the power reception coil 2 employs a coil prepared by winding a wire unevenly, or one prepared by gradually changing wire pitches, for example. The wire pitches may change in a range from a−1.5 d to a+1.5 d, for instance. Thereby, values of stray capacitance between the pitches of the wire gradually change. As a consequence, the power reception coil 2 exhibits a multi-resonance characteristic having a larger half width Δf, as shown in FIG. 8. In the example shown in FIG. 7, the pitches of the wire of the power reception coil 2 define an arithmetic series. However, the invention is not limited only to this configuration. A similar effect can also be obtained by using a geometric series or a series having a form of an inverse number of the geometric series, for example. Meanwhile, FIG. 9 shows an example of the power reception coil 2 which is wound in a three-dimensionally uneven manner. This configuration can also achieve similar operation and effect.

Fifth Embodiment

Figure 10:
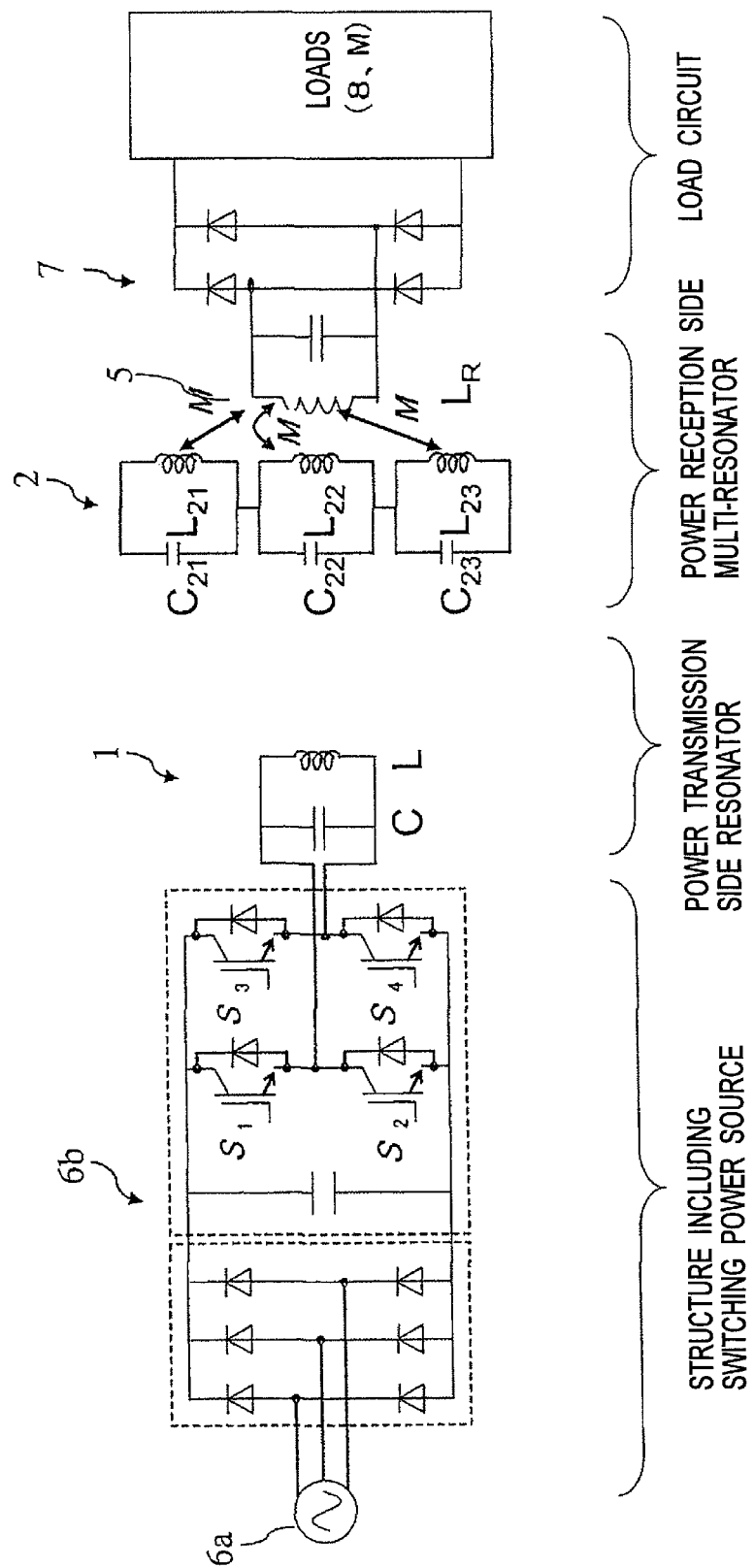
FIG. 10 is a perspective view showing another layout example of the power transmission coil 1 and the power reception coil 2 in FIG. 1.

FIG. 10 is a perspective view showing the power transmission coils 1 and the power reception coils 2 to which a fifth embodiment of the present invention is applied. Each power transmission coil 1 of the fifth embodiment is a single-resonant coil prepared by winding a wire evenly (at the pitch a) as shown in FIG. 7 or FIG. 9. The three power transmission coils 1 are located in the vicinity of the ground of a power feeding spot, for example, in positions respectively corresponding to the corners of an equilateral triangle. Then, the electric power from the switching power source 6b is transmitted to the power transmission coils 1 by electromagnetic induction M with the primary coil 4.

In the meantime, each power reception coil 2 of the fifth embodiment is a multi-resonance coil prepared by winding a wire in such a manner as to gradually change the pitches within the range from a−1.5 d to a+1.5 d as shown in FIG. 7 or FIG. 9. The three power reception coils 2 are located in the vicinity of a floor of the electric vehicle V, for example, in positions respectively corresponding to the corners of an equilateral triangle. Then, the electric power received by the power reception coils 2 is transmitted to the load circuit 8 by electromagnetic induction M with the secondary coil 5.

In the fifth embodiment, the multiple power transmission coils 1 each prepared by winding the wire evenly, and the multiple power reception coils 2 each prepared by winding the wire in such a manner as to gradually change the pitches are arranged. Thereby, even in case of a variation in the resonant frequency $f_0$ of the LC resonant circuit of any of the power transmission coils 1, the alternating-current power can be efficiently transmitted as long as the variation falls within the predetermined range, i.e., within the range of the combined half width Δf (see FIG. 6) of the LC resonant circuits constituting the power reception coil 2. Furthermore, it is also possible to suppress a reduction in power transmission efficiency attributable to misalignment between the power transmission side and the power reception side. In other words, since the multiple transmission coils 1 and the multiple reception coils 2 are provided, the reduction in power transmission efficiency can be suppressed even when a stop position of the electric vehicle V deviates more or less from the power feeding spot.

Although three power transmission coils 1 and three power reception coils 2 are provided in the example shown in FIG. 10, the number of each coil is not limited only to three. In addition, the number of the power transmission coils 1 and the number of power reception coils 2 do not have to be equal to each other, but the numbers of the coils may be different. Moreover, the layout positions of the three coils are not limited to the corners of the triangle. The coils may be arranged in a front-back direction or a widthwise direction of the electric vehicle V, for example.

6th Embodiment

Figure 11:
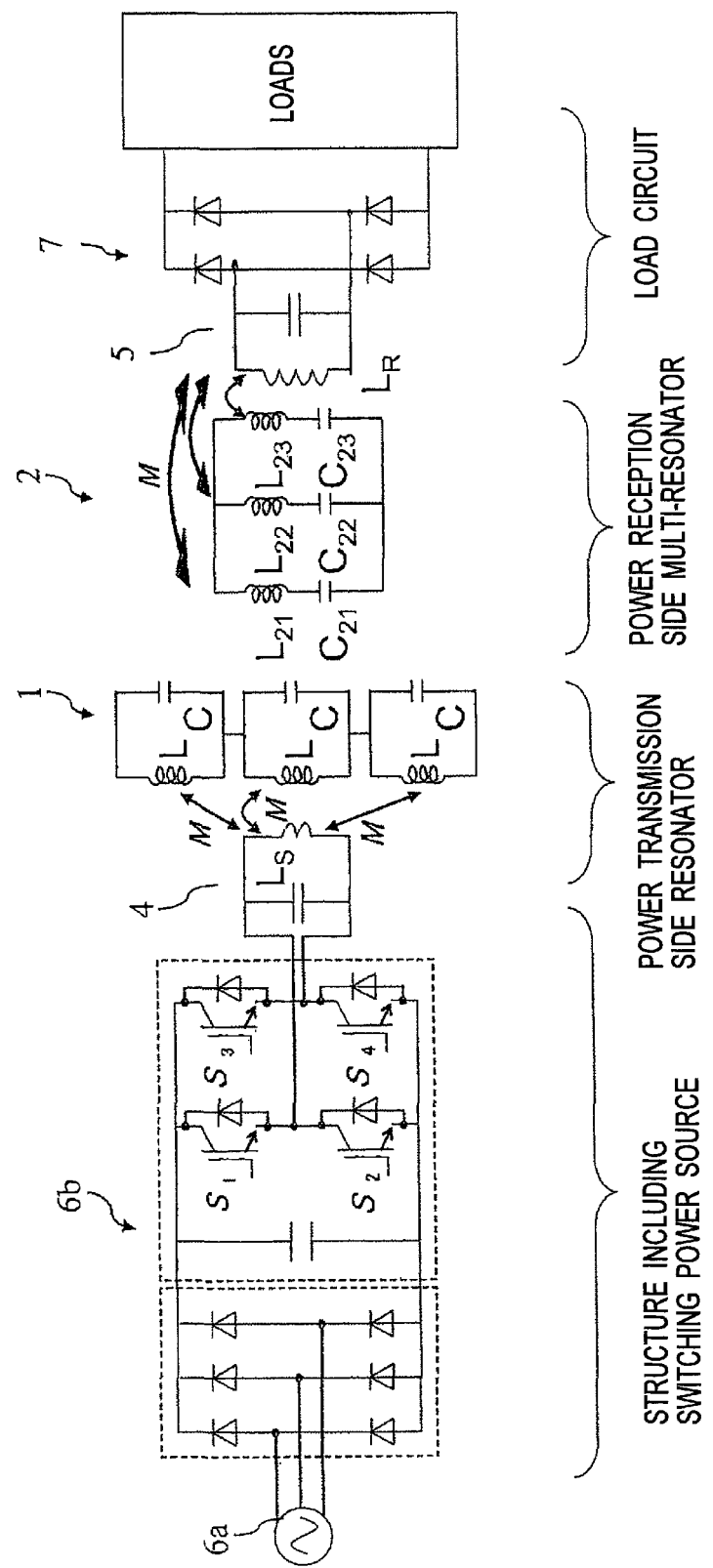
FIG. 11 is an electric circuit diagram showing another detailed configuration example of the power feeding system in FIG. 1.

FIG. 11 is an electric circuit diagram showing a power feeding system to which a 6th embodiment of the present invention is applied. In this embodiment, the primary coil 4 for transferring energy from the switching power source 6b to the power transmission coil 1 is omitted, and the power transmission coil 1 is connected directly to the switching power source 6b. The power feeding system thus configured also exhibits the operation and effect similar to those of the first to fifth embodiments. Furthermore, the omission of the primary coil 4 brings about an effect that it is possible to achieve lower costs, smaller sizes, and lower losses of the resonant circuits.

7th Embodiment

Figure 12:
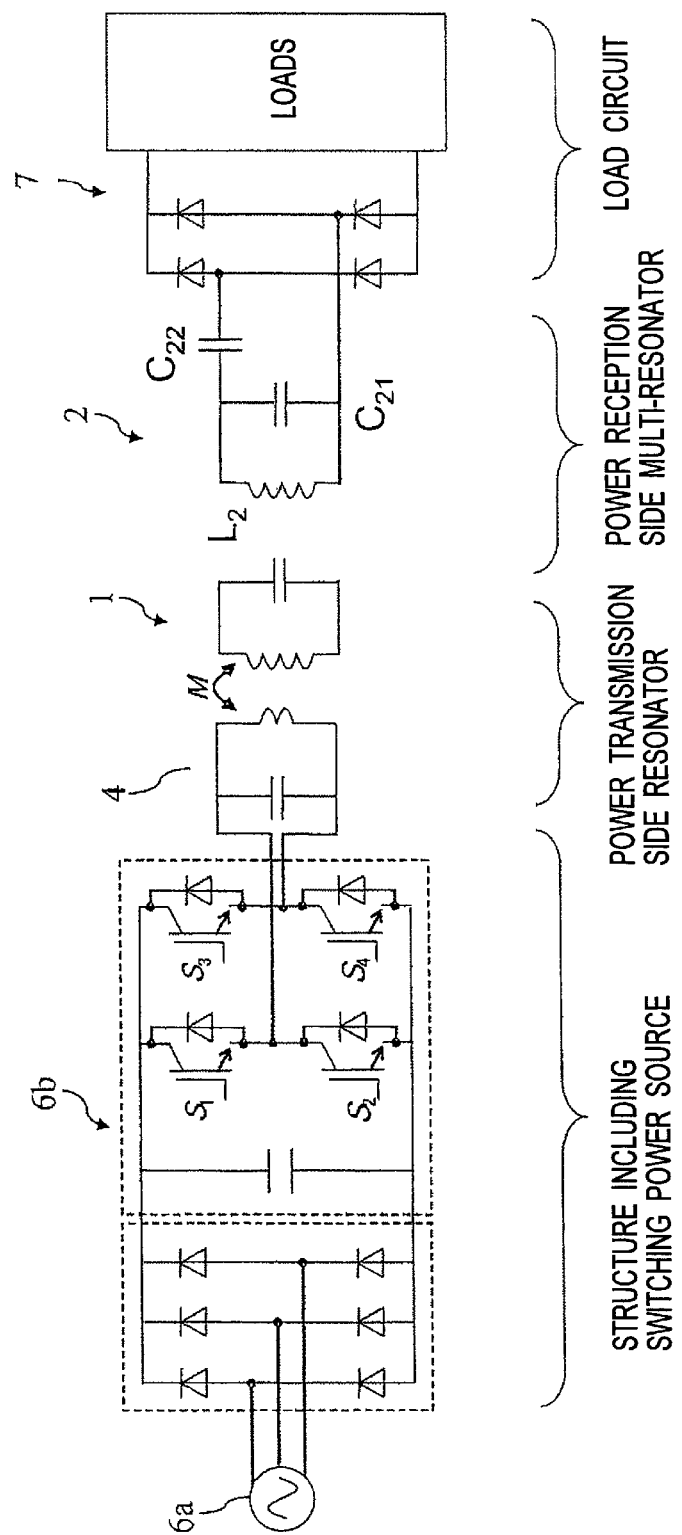
FIG. 12 is an electric circuit diagram showing still another detailed configuration example of the power feeding system in FIG. 1.

FIG. 12 is an electric circuit diagram showing a power feeding system to which a 7th embodiment of the present invention is applied. While the examples using the parallel LC resonant circuits have been described for the first to 6th embodiments, the same effect can also be obtained by using serial LC resonant circuits that exhibit an antiresonance characteristic. Specifically, as shown in FIG. 12, the power reception coils 2 includes three LC resonant circuits each formed by connecting a coil L and a capacitor C in series, and the three serial LC resonant circuits are connected together in parallel. Although the single-resonance parallel LC resonant circuits are used as the power transmission coil 1, serial LC resonant circuits may be used as long as the circuits have a single-resonance structure.

8th Embodiment

Figure 13:
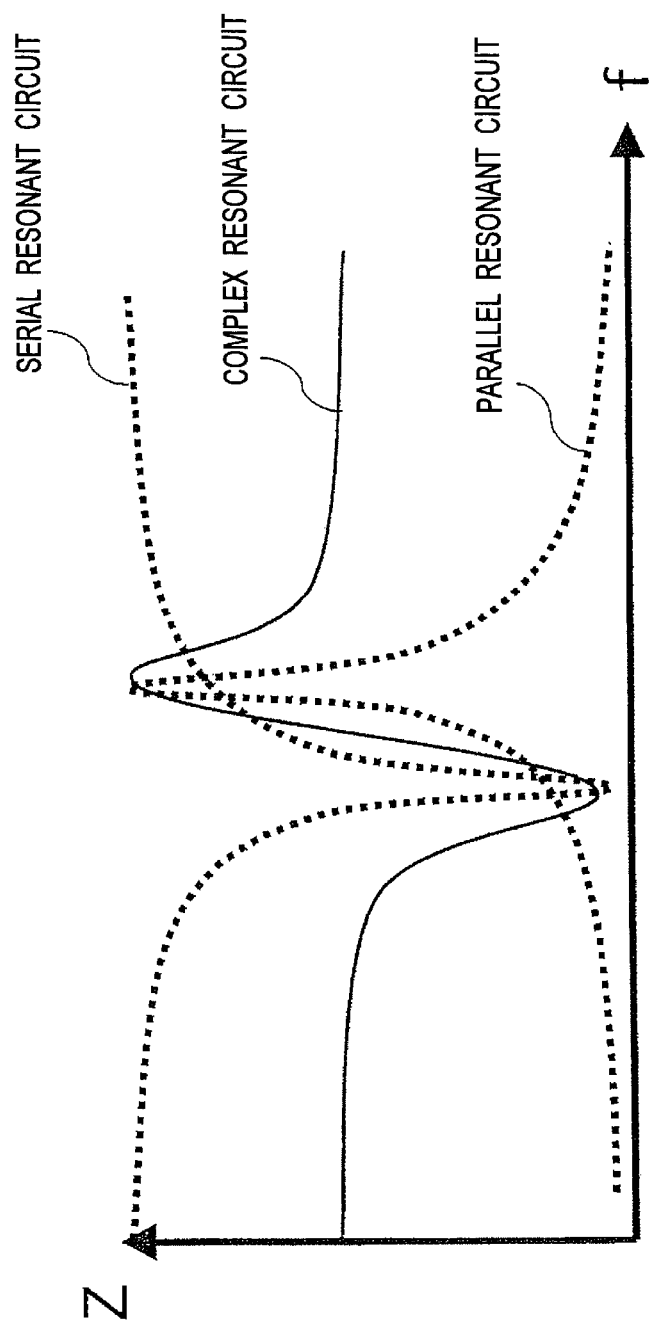
FIG. 13 is an electric circuit diagram showing yet another detailed configuration example of the power feeding system in FIG. 1.

FIG. 13 is an electric circuit diagram showing a power feeding system to which an eighth embodiment of the present invention is applied. The power transmission coil 1 or the power reception coil 2 may use a complex resonant circuit obtained by combining a parallel LC resonant circuit and a serial LC resonant circuit. FIG. 13 shows an example of the power reception coil 2 which is obtained by combining a parallel LC resonant circuit and a serial LC resonant circuit having resonant frequencies which are mutually different while falling within a range of a half width of each other. Specifically, a coil $L_2$ and a capacitor $C_{21}$ constitute the parallel LC resonant circuit while the coil $L_2$ and a capacitor $C_{22}$ constitute the serial LC resonant circuit in FIG. 13.

It is to be noted that the secondary coil 5 for transferring the energy from the power reception coil 2 to the load 8 is omitted in the example shown in FIG. 13. The omission of the secondary coil 5 brings about an effect that it is possible to achieve lower costs, smaller sizes, and lower losses of the resonant circuits. Moreover, the primary coil 4 may also be omitted in the example shown in FIG. 13.

Figure 14:
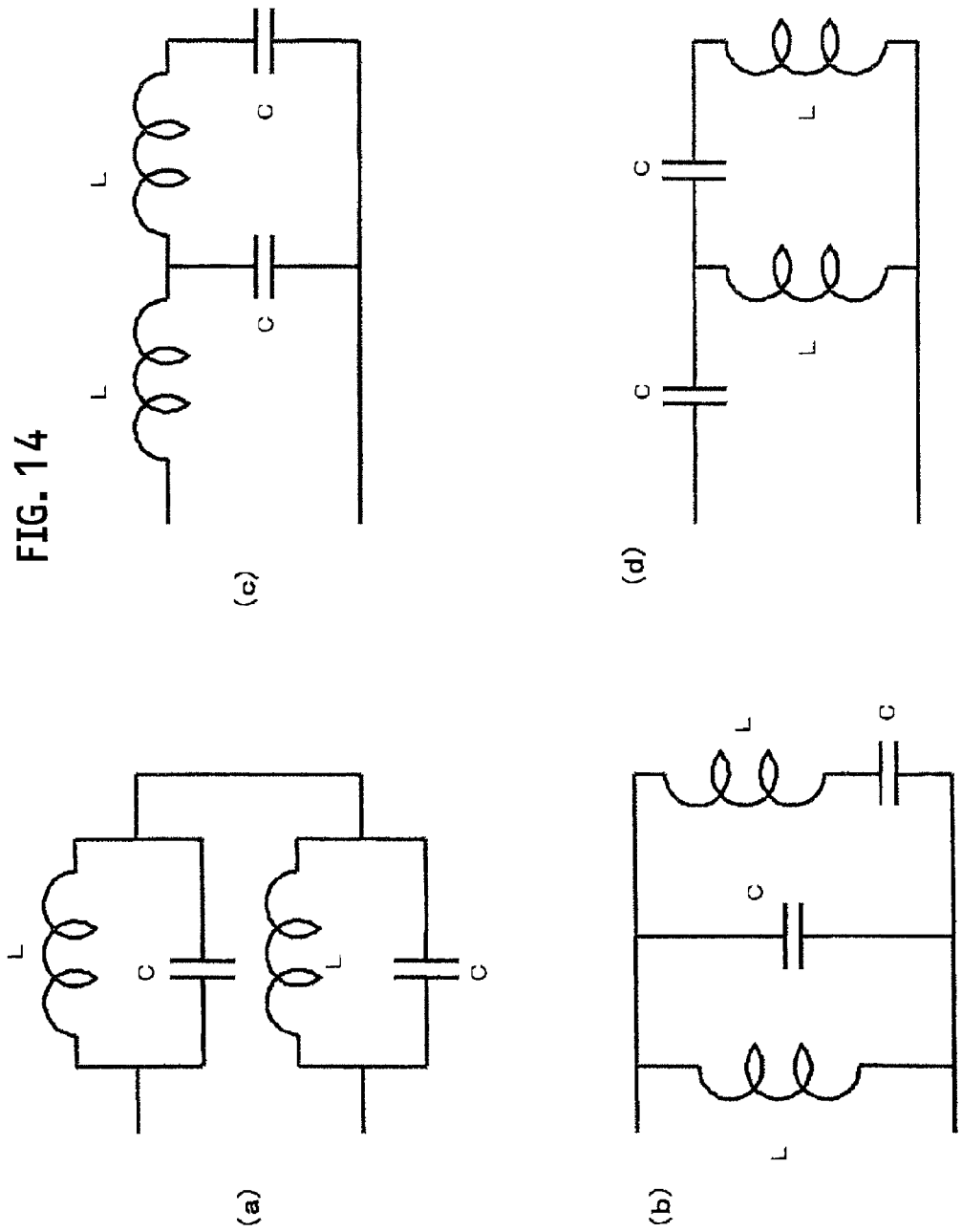
FIG. 14 is a graph showing a resonance characteristic of a power reception coil 2 in FIG. 12.
Figure 15:
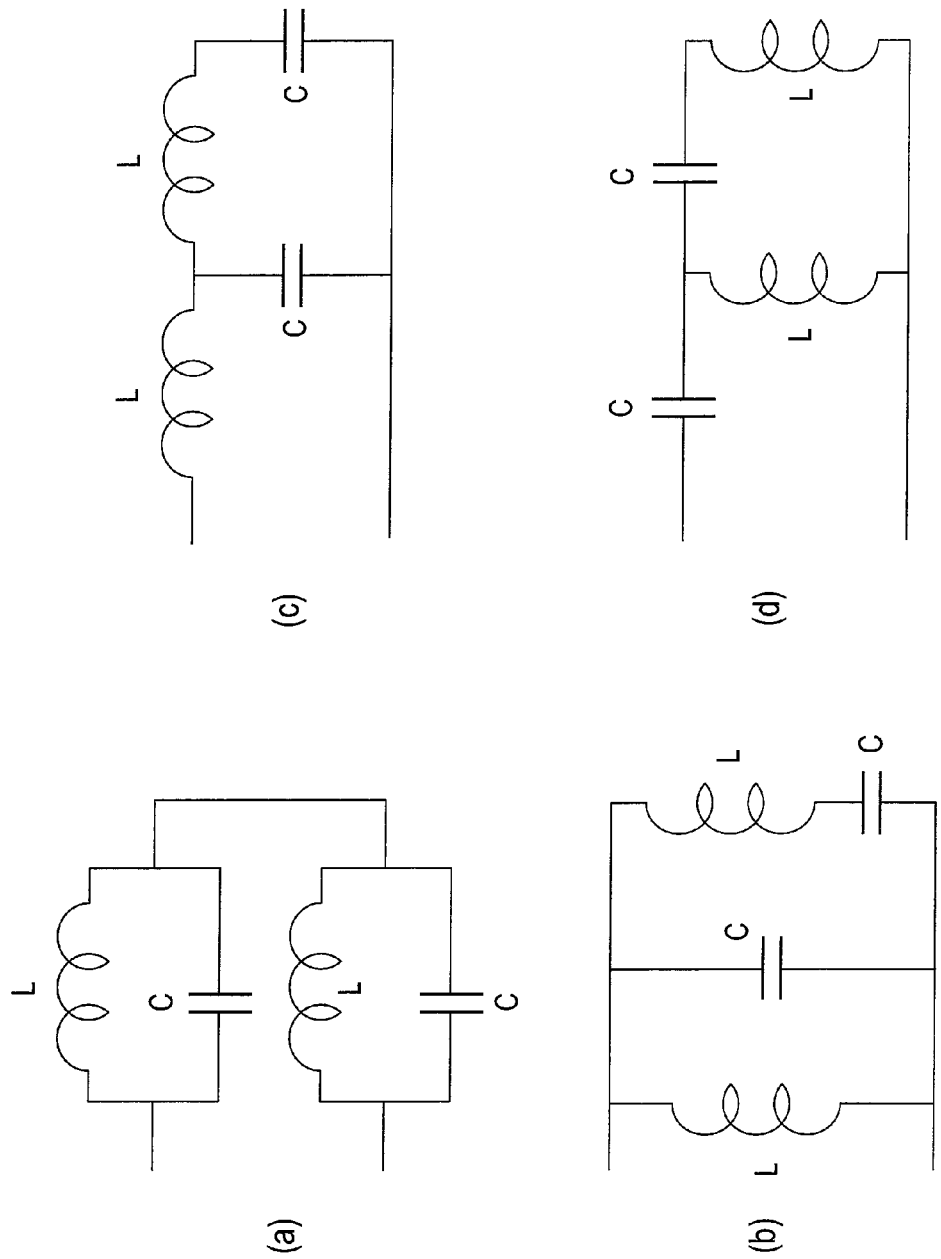
FIG. 15 is an electric circuit diagram showing other configuration examples of the power transmission coil 1 or the power reception coil 2 in FIG. 1.

FIG. 14 shows a resonance characteristic of the complex resonant circuit which is obtained by combining the parallel LC resonant circuit (a parallel resonant circuit) and the serial LC resonant circuit (a serial resonant circuit). In FIG. 14, curves indicated with dashed lines respectively represent the resonance characteristics of the parallel resonant circuit and the serial resonant circuit while a curve indicated with a solid line represents the resonance characteristic of the complex resonant circuit.

The power transmission coil 1 or the power reception coil 2 may include any of resonant circuits shown in FIG. 15(a) to FIG. 15(d). FIG. 15(a) to FIG. 15(d) are electric circuit diagrams showing other configuration examples of any of the power transmission coil 1 and the power reception coil 2, in which each reference sign L indicates a coil while each reference sign C indicates a capacitor.

In the embodiments described above, the power transmission coil 1 is set at the predetermined single resonant frequency $f_0$, and the resonant frequencies of the power reception coil 2 are set at the multiple resonant frequencies $f_1$, $f_2$, $f_3$ inclusive of the resonant frequency $f_0$. Here, the configurations of the power transmission coil 1 and the power reception coil 2 may be inverted. Specifically, in either the electric circuits shown in FIG. 2 or the electric circuits formed by inverting the power transmission coil 1 and the power reception coil 2 in FIG. 5, the resonant frequency of the power reception coil 2 may be set at the predetermined single resonant frequency $f_0$ while the resonant frequencies of the power transmission coil 1 may be set at the multiple resonant frequencies $f_1$, $f_2$, $f_3$ inclusive of the resonant frequency $f_0$.

It is to be noted, however, that power transmission efficiency is increased by setting the single resonant frequency on the power transmission coil 1 side because it is possible to prevent the power transmission coil 1 from entering into resonance with an objected located near the power reception coil 2. In other words, the concentration of power transmission energy from the power transmission coil 1 on the single frequency makes it possible to minimize adverse effects on the area surrounding the power transmission coil 1, and to minimize losses attributable thereto.

The power transmission coil 1 corresponds to a "power transmission resonator" and "power transmission resonating means" according to the present invention. The power reception coil 2 corresponds to a "power reception resonator" and "power reception resonating means" according to the present invention. The high-frequency alternating-current power source 6a corresponds to a "power source" according to the present invention. The electric vehicle V corresponds to a "vehicle" according to the present invention. A parallel or serial LC resonant circuit included in each of the power transmission coil 1 and the power reception coil 2 corresponds to a "resonant circuit" according to the present invention. The power transmission coil 1 and the power reception coil 2 correspond to a "pair of resonators" according to the present invention.

Although the embodiments of the present invention have been described above, it is to be understood that the embodiments are described in order to facilitate understandings of the present invention and are not intended to limit the scope of the present invention. In this context, the constituents disclosed in the above-described embodiments should also include all design changes and equivalents thereto which belong to the technical scope of the present invention.

"The entire contents of a Japanese Patent Application No. P2010-080737 with a filing date of Mar. 31, 2010 and a Japanese Patent Application No. P2010-271282 with a filing date of Dec. 6, 2010 are herein incorporated by reference."

INDUSTRIAL APPLICABILITY

According to the present invention, even when the resonant frequency for one of the power transmission resonator and the power reception resonator varies due to an external factor or the like, it is still possible to transmit the electric power using the varied resonant frequency because the other one of the power transmission resonator and the power reception resonator has multiple resonant frequencies including the aforementioned resonant frequency. Thereby, deterioration in power transmission efficiency can be suppressed even in case of a relative variation in the resonant frequency. Thus, the noncontact power feeding apparatus and the noncontact power feeding method according to the present invention are industrially applicable.

The invention claimed is:

1. A noncontact power feeding apparatus comprising:
a power transmission resonator; and
a power reception resonator configured to be magnetically coupled with the power transmission resonator by magnetic field resonance, wherein
the power transmission resonator is magnetically coupled with the power reception resonator by the magnetic field resonance, wherein electric power is supplied from an electric power source to the power reception resonator through the power transmission resonator,
a first resonator that is the power transmission resonator or the power reception resonator has a predetermined single resonant frequency,
a second resonator that differs from the first resonator and is the power transmission resonator or the power reception resonator includes a multi-resonance circuit having the predetermined single resonant frequency and a resonant frequency different from the predetermined single resonant frequency,
the multi-resonance circuit includes a plurality of LC resonant circuits each formed by connecting a coil and a capacitor in series, wherein the LC resonant circuits are connected together in parallel,
the resonant frequency that is different from the predetermined single resonant frequency is set within a range of a half width of the predetermined single resonant frequency, and
the multi-resonance circuit is configured such that the predetermined single resonant frequency does not vary.

2. The noncontact power feeding apparatus according to claim 1, wherein the first resonator comprises a coil having an even winding pitch.

3. The noncontact power feeding apparatus according to claim 1, wherein the second resonator comprises a coil having a varying winding pitch.

4. The noncontact power feeding apparatus according to claim 1, wherein the first resonator comprises as many resonant circuits as the second resonator, and each of the resonant circuits of the power transmission resonator is located in the vicinity of a corresponding one of the resonant circuits of the power reception resonator.

5. The noncontact power feeding apparatus according to claim 1, wherein the first resonator is the power transmission resonator, and the second resonator is the power reception resonator.

6. The noncontact power feeding apparatus according to claim 5, comprising:

a plurality of power transmission resonators; and a plurality of power reception resonators.

7. A noncontact power feeding method, comprising:

magnetically coupling a pair of resonators by magnetic field resonance, one of the pair of resonators having a predetermined single resonant frequency, the other one of the pair of resonators including a multi-resonance circuit having the predetermined single resonant frequency and a resonant frequency different from the predetermined single resonant frequency, and supplying electric power from an electric power source to the other of the pair of resonators through the one of the pair of resonators, wherein the multi-resonance circuit includes a plurality of LC resonant circuits each formed by connecting a coil and a capacitor in series, wherein the LC resonant circuits are connected together in parallel, wherein the resonant frequency that is different from the predetermined single resonant frequency is set within a range of a half width of the predetermined single resonant frequency, and wherein the multi-resonance circuit is configured such that the predetermined single resonant frequency does not vary.

8. A noncontact power feeding apparatus comprising:

power transmission resonating means; and power reception resonating means for being magnetically coupled with the power transmission resonating means by magnetic field resonance, wherein the power transmission resonating means is magnetically coupled with the power reception resonating means by the magnetic field resonance, electric power is supplied from an electric power source to the power reception resonating means through the power transmission resonating means, a first resonating means that is the power transmission resonating means or the power reception resonating means has a predetermined single resonant frequency, a second resonating means that differs from the first resonating means and is the power transmission resonating means or the power reception resonating means includes a multi-resonance circuit having the predetermined single resonant frequency and a resonant frequency different from the predetermined single resonant frequency, and the multi-resonance circuit includes a plurality of LC resonant circuits each formed by connecting a coil and a capacitor in series, wherein the LC resonant circuits are connected together in parallel, the resonant frequency that is different from the predetermined single resonant frequency is set within a range of a half width of the predetermined single resonant frequency, and the multi-resonance circuit is configured such that the predetermined single resonant frequency does not vary.

* * * * *